United States Patent
Carlens et al.

(10) Patent No.: US 9,410,718 B2
(45) Date of Patent: Aug. 9, 2016

(54) DEVICE FOR PREHEATING A FLUID, NOTABLY A COMBUSTION ENGINE COOLANT FLUID

(71) Applicant: Nino Volante, Milmort (BE)

(72) Inventors: Jean-Claude Carlens, Manhay (BE); Jean-François Zune, Gouvy (BE)

(73) Assignee: Nino Volante, Milmort (BE)

( * ) Notice: Subject to any disclaimer, the term of this patent is extended or adjusted under 35 U.S.C. 154(b) by 0 days.

(21) Appl. No.: 14/370,679

(22) PCT Filed: Jan. 2, 2013

(86) PCT No.: PCT/EP2013/050015
§ 371 (c)(1),
(2) Date: Jul. 3, 2014

(87) PCT Pub. No.: WO2013/102629
PCT Pub. Date: Jul. 11, 2013

(65) Prior Publication Data
US 2015/0013632 A1    Jan. 15, 2015

(30) Foreign Application Priority Data
Jan. 4, 2012 (BE) .................................. 2012/0006

(51) Int. Cl.
| B60H 1/03 | (2006.01) |
| F24H 1/12 | (2006.01) |
| F02N 19/10 | (2010.01) |
| F02N 19/02 | (2010.01) |
| F01M 5/02 | (2006.01) |
| F02N 19/04 | (2010.01) |
| F01P 11/20 | (2006.01) |
| F28F 7/02 | (2006.01) |

(52) U.S. Cl.
CPC ................ *F24H 1/121* (2013.01); *F02N 19/10* (2013.01); *F01M 5/021* (2013.01); *F01P 11/20* (2013.01); *F02N 19/02* (2013.01); *F02N 19/04* (2013.01); *F28F 7/02* (2013.01); *Y02P 80/15* (2015.11)

(58) Field of Classification Search
CPC ......... F02N 19/10; F02N 19/02; F02N 19/04; F01M 5/021; F01P 11/20
USPC ..................................................... 123/142.5 E
See application file for complete search history.

(56) References Cited

U.S. PATENT DOCUMENTS

| 4,762,980 A | * | 8/1988 | Insley ............................ 392/494 |
| 6,055,947 A | * | 5/2000 | Okuno ....................... 123/41.13 |

FOREIGN PATENT DOCUMENTS

| DE | 3217758 A1 | 11/1983 |
| DE | 8701656 U1 | 3/1987 |

(Continued)

OTHER PUBLICATIONS

Written Opinion of the International Searching Authority dated Jul. 8, 2014 from counterpart International App. No. PCT/EP2013/050015.

(Continued)

*Primary Examiner* — Lindsay Low
*Assistant Examiner* — Charles Brauch
(74) *Attorney, Agent, or Firm* — James E. Walton

(57) ABSTRACT

The invention relates to a device for heating a fluid, essentially comprising a heating body with a solid element and one or more electric resistors of rectangular section of the PTC type which are arranged in grooves on the exterior surface of the solid element. The latter comprises a U-shaped passage for fluid. The invention also relates to a vehicle engine fitted with such a device for preheating or heating the coolant. The invention also relates to a method for preheating or heating using such a device.

18 Claims, 2 Drawing Sheets

(56) References Cited

FOREIGN PATENT DOCUMENTS

| DE | 202005017693 U1 | 2/2006 |
|---|---|---|
| GB | 2014417 A | 8/1979 |
| GB | 2079421 A | 1/1982 |

OTHER PUBLICATIONS

International Search Report dated Jul. 16, 2013 for PCT/EP2013/050015.

* cited by examiner

DEVICE FOR PREHEATING A FLUID, NOTABLY A COMBUSTION ENGINE COOLANT FLUID

TECHNICAL FIELD

The invention relates to a device for heating a fluid, in particular a fluid of a combustion engine, in particular a cooling fluid of such an engine. The present invention also relates to a method for heating fluid for many applications.

The fluid can be sanitary water, chlorinated water, water/glycol, hydrocarbons (diesel, gasoline, oil, . . . ), vegetable oils (rapeseed), gas in liquid or gaseous state, . . . .

Examples of heating applications are numerous: industrial, generators, cogeneration units, internal combustion engines (petrol, diesel, LPG, . . . ) pools, spas, hot water, aquariums, ponds, . . . .

PRIOR ART

The engines of emergency generators (hospitals, companies, . . . ) must be kept at an ideal temperature (±40° C.) for their immediate start, to ensure within a few seconds electricity supply in case of mains failure.

The engine emergency vehicles (ambulance, fire brigade, . . . ) must be heated beforehand to ensure an immediate start in the best conditions to ensure their interventions.

The engines of passenger cars can also be heated before starting to not only start in good conditions, but also to improve passenger comfort, by providing a warm cabin directly, defogged and defrosted windows. Numerous studies have demonstrated a beneficial effect on the reduction of fuel as well as the reduction of pollution at start by using a heater.

Manufacturers offer commercial heaters with external power supplies that operate on the principle of thermo syphon. The heating element is directly immersed in the heating body, or in the water chambers of the engine and hence directly in contact with the fluid. To reduce its size, the specific charge per cm$^2$ is relatively high and therefore unreliable over time. Performance thereof is very low and the placement on the circuit is not easy to allow the heat circulation. For over a decade, motorists have significantly changed the design of water chambers in the engines and it becomes difficult to place this type of heaters, because this configuration does not allow creating effective circulation by the thermo syphon principle and heating properly and evenly engines.

Others offer devices with a circulating pump. The heating element (to be immersed) is also directly immersed in water. The yield is significantly higher than in the process by thermo syphon. However, the space needed is still too high to allow easy placement on intermediate vehicles (passenger cars, ambulances, trucks . . . ). In addition, commonly used pumps must be positioned horizontally, which further reduces the possibilities of integration under the bonnet. The only possibility would be to reduce the overall size of such devices by reducing the length of the heating element. This solution would affect reliability because we would depart from the standards usually provided by the manufacturers for the maximum load of the heating elements for this type of fluid. This would cause boiling of the fluid in the heating element that would result in a degradation of the shield thereof, and then this degradation would continue with premature rupture of the element.

Patent document WO 2011/016763 A1 discloses a device for preheating the coolant of a combustion engine. It essentially comprises a main body with an interior volume, an inlet, an outlet, and a heating body disposed in the interior volume of the main body. The heating body itself comprises an internal volume in which are disposed one or more electrical resistors of the PTC type with a positive temperature coefficient (PTC stands for "positive temperature coefficient"). The preheating device has the advantage of being quite simple in construction. The thermal connection between the resistors and the fluid is, however, not optimal. In addition, the main body is subject to significant losses to the atmosphere. The thermal efficiency of this device is therefore not optimal. This device seems to work on the principle of thermo syphon, which limits the performance of heating.

Patent document DE 102 58 257 A1 also discloses a device for preheating the fluid of a combustion engine, such as fuel, lubricant or coolant. It essentially comprises an elongated main body with a fixation flange. The main body is intended to be immersed in the fluid and the flange ensures a tight fit on a wall. The main body comprises several items including a frame, a conductive sheet and heating elements of the positive temperature coefficient PTC type (PTC acronym for "Positive Temperature Coefficient"). This preheating device has the same disadvantage as the one of the above-mentioned document, i.e. that the thermal contact between the heating elements and the fluid is not optimized. This device seems to work on the principle of thermo syphon, which limits the performance of heating.

Patent document WO 01/33071 A1 discloses a method of preheating an engine and a device for the implementation of the method in question. The method consists essentially in providing a heating element such as an electrical resistance in a tank separated from the engine and containing the cooling fluid of the engine. The electrical resistance of the spiral type is in direct contact with the fluid. Direct contact is not desirable for certain applications. In addition, the overall size of the device is quite large and may cause integration problems. This device seems to work on the principle of thermo syphon, which limits the performance of heating.

Patent document U.S. Pat. No. 4,371,777 relates to a fluid heating body forming a U-shaped circuit and comprising heating elements of the PTC type. These are arranged in the hollow of the U, the U being formed by a bent pipe provided with two solid elements in close contact with the pipe and between which the PTC elements are arranged. Alternatively, the heating body may include two solid elements disposed one against the other via a seal at the fluid passage for providing a seal. A cap is provided in two parts. The power of heat exchange is limited in this teaching, especially due to the limited diameter of the bent pipe and the limited number of heating elements.

Patent document DE 200 20 347 U shows a heating body with a straight passage for a fluid and a housing for a ceramic heating element. The power of heat exchange is very limited.

Patent document U.S. Pat. No. 7,865,073 B2 shows a heating body especially for coffee machines, with a fluid passage formed by a pipe bent in U, a non-solid body in which the two legs of the U are inserted in which one or more heating elements of the PTC type are inserted. The power of heat exchange is limited in this teaching, especially due to the limited diameter of the bent pipe and the limited number of heating elements.

SUMMARY OF THE INVENTION

Technical Problem

The invention aims to provide a device for heating fluid that overcomes at least one of the above mentioned disadvantages.

More particularly, the invention aims to provide a fluid heating device having an improved thermal performance and a simple and economical construction. More particularly, the invention seeks to provide a compact fluid heating device of simple and economical construction.

Technical Solution

The invention relates to a device for heating a fluid, comprising: a heating body with a U-shaped passage for the fluid; and at least one electric resistor disposed close to the heating body; remarkable in that the heating body comprises a solid element with, inside said body, the sections of the fluid passage corresponding to the legs of the U.

Preferably the solid element comprises also the section of passage for the fluid which corresponds to the junction of the legs of the U. According to an advantageous embodiment of the invention, the solid element of the heating body comprises at least one open groove extending along and in front of the hollow of the U-shape of the passage for the fluid, preferably the solid element comprising such a groove on each side of the hollow of the U, the at least one groove receiving the at least one electrical resistor.

According to another advantageous embodiment of the invention, the least one electrical resistor is generally elongated and flat, and is substantially embedded in the at least on groove of the solid element of the heating body.

According to a further advantageous embodiment of the invention, the at least one groove is/are have a rectangular cross-section with the long side substantially parallel to the plane of the U and the small side transverse to the plane of the U.

According to yet another advantageous embodiment of the invention, the width of the at least one groove and the width of the at least one resistor housed in said at least one groove are between 50% and 150%, preferably between 80% and 120%, more preferably between 90% and 110% of the width of the hollow.

According to yet another advantageous embodiment of the invention, the width of the hollow is greater than two times, preferably three times, the mean diameter of the fluid passage.

According to yet another advantageous embodiment of the invention, the heating body comprises at least one closure plate of the at least one groove, intended to be fixed to the solid body, the at least one plate being preferably fixed to the solid body by screwing.

According to yet another advantageous embodiment of the invention, the U-shaped passage is formed by drilling the solid element of the heating body, the solid element being preferably provided with at least a plug closing at least one of the drill holes.

According to yet another advantageous embodiment of the invention, the at least one plug is a thimble disposed in the fluid passage.

According to yet another advantageous embodiment of the invention, the fluid inlet in the heating body is at the free end of one of the legs of the U and/or the fluid outlet of the heating body is at the free end of the other/one of the legs of the U.

According to yet another advantageous embodiment of the invention, the solid element of the heating body is generally elongate along a principal direction, said element being preferably of parallelepiped shape.

According to yet another advantageous embodiment of the invention, the contour of the cross section of the solid element exceeds a rectangle including the two portions of the fluid passage corresponding to the legs of the U.

According to a further advantageous embodiment of the invention, the solid element is made of solid material.

According to yet another advantageous embodiment of the invention, the ratio between the length and the width and/or thickness of the solid element of the heating body is greater than 2, preferably greater than 3, more preferably greater to 4.

According to yet another advantageous embodiment of the invention, the at least one electrical resistor is of the positive temperature coefficient type.

According to yet another advantageous embodiment of the invention, the device includes a circulating pump hydraulically connected to the heating body, preferably at the outlet of the fluid in the heating body.

According to yet another advantageous embodiment of the invention, the heating body is covered by a cap with, a thermal insulation.

According to a further advantageous embodiment of the invention, the at least one electrical resistance is not in direct contact with the fluid.

According to yet another advantageous embodiment of the invention, the solid element of the heating body is in heat conductive material, preferably selected from the following materials: aluminum, brass, stainless steel, plastic material. By heat-conductive material is meant a thermal conductivity greater than or equal to 10 W m$^{-1}$ K$^{-1}$, preferably 20 W m$^{-1}$ K$^{-1}$, more preferably 50 W m$^{-1}$ K$^{-1}$, more preferably 100 W m$^{-1}$ K$^{-1}$.

According to a further advantageous embodiment of the invention, the solid element of the heater is in one piece, preferably is made of the same material.

The invention also relates to a combustion engine equipped with a device for heating the coolant, remarkable in that the device is according to the invention.

The invention also relates to a method of preheating the coolant of an internal combustion engine with a heating device, remarkable in that the device is according to the invention.

Benefits of the Invention

The steps of the invention have the advantage of optimizing the thermal yield, specifically by increasing the efficiency of heat exchange between the heating resistors and the fluid, and also by reducing losses at the atmosphere. Indeed, the construction of the heating body according to the invention allows an intimate contact with the fluid and with the resistors, and this in a very compact manner. The fluid passage may be dimensioned with a larger section which results in less pressure loss and increased efficiency. The open grooves of the heating body give a great modularity in respect of the number and/or size of the electrical resistors. This modularity is particularly advantageous to adapt the heating device for different applications. Indeed, one or more resistors can be connected to a voltage of 110 or 230 VAC (typically the home network) during the preheating of the engine of a vehicle at standstill. One or more additional resistors can be supplied with a voltage of 12 or 24 VDC provided by the vehicle battery to continue heating when the engine is running. The compact geometry of the heating body shape allows isolating easily by equipping it with an insulating cap. The latter may be provided detachably, which again is made easy by the optimized shape of the heating body.

DESCRIPTION OF EMBODIMENTS

Figures 1, 2, 3:
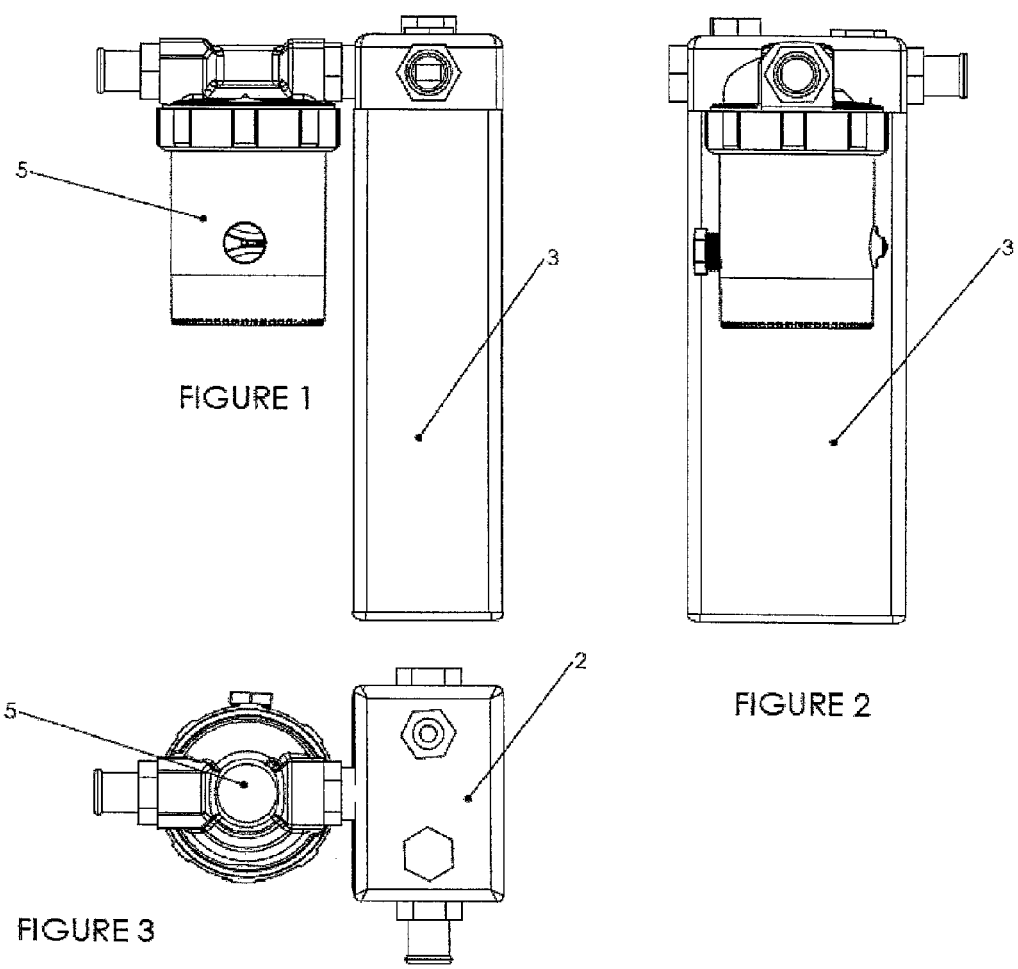
FIG. 1 is a plan view of the heating device of a fluid according to the invention.
FIG. 2 is a side view of the heating device of FIG. 1.
FIG. 3 is an elevation view of the heating device of FIG. 1.

The fluid heating or preheating device shown in FIGS. 1 to 3 essentially comprises a heating body wrapped with an insulating cap 3 and a circulation pump 5. The heating body is generally elongated and has a generally rectangular section. It comprises a fluid inlet at its upper end, and an outlet disposed at the level of the inlet and oriented at about 90°, connected directly to the circulating pump 5.

FIGS. 4-7 illustrate the body of the heating device, free of its insulation cap 3. It can be seen that it comprises a solid element 2 of a generally rectangular section and extending in length. This is preferentially a block made of a metallic heat conducting material such as aluminum. As is clearly visible in FIGS. 6 and 7, it is drilled on a large part of its length from its top face to near its bottom face, and this two times in two parallel directions. These two vertical drill holes are thus arranged near the ends of the rectangular section of the solid element. Each of these two drill holes is closed by a respective plug, as is well visible in FIG. 7. One of the plugs is a thimble extending into the drill hole thus formed. A horizontal drill bore is formed at the bottom of the element, so as to form a passage between the two vertical drill holes. As is also visible in FIG. 7, a plug is provided so as to close the drill bore at the outer surface of the element, so as to close the hole made between the outer surface and the lower end of the corresponding vertical drill hole. Still in FIG. 7, one can observe that another horizontal drill hole was performed, and this at the top of the element and approximately over one half of the width of the element to form a passage between the fluid inlet (located at a central and high position of the element) and the left vertical drill hole. A plug is also provided so as to close the opening thereby formed between the vertical drill hole in question and the corresponding outer surface of the element. The outlet is provided by a horizontal drill hole on the opposite side, the drill hole being limited to the material located between the right vertical drill hole and the corresponding outer surface of the element.

Figures 4, 5, 6, 7:
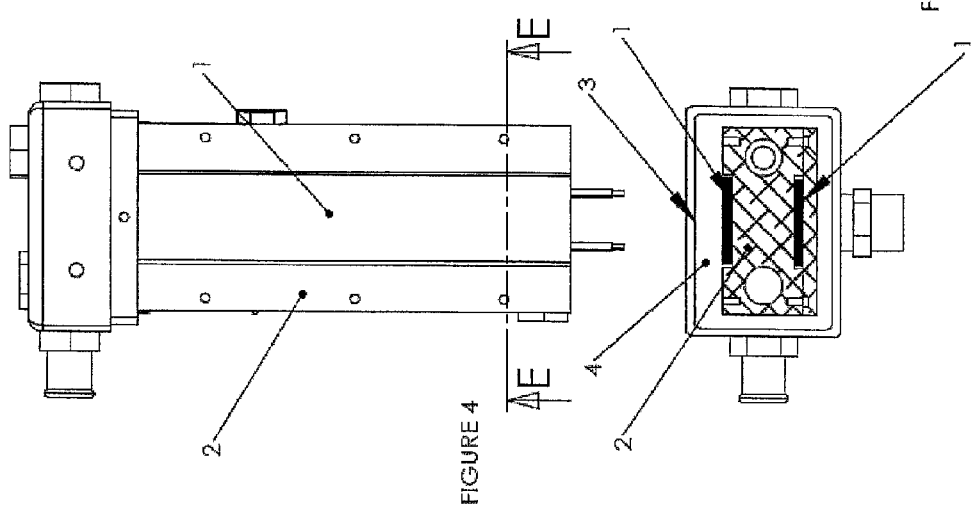
FIG. 4 is a right side view of the heating device of FIGS. 1 to 3, wherein the heating body is without its insulating cap.
FIG. 5 corresponds to FIG. 1 wherein the heating body is without its insulating cap.
FIG. 6 is a sectional view along E-E of the heating body of the device as shown in FIG. 4.
FIG. 7 is a sectional view along F-F of the heating body of the device as shown in FIG. 5.

The drill holes described above thus form a fluid passage within the material of the element, said passage having an at least substantially U-shape. Referring to FIG. 6, the solid element 2 comprises a recess on each of its two main faces. It extends over a major part of the length of the solid element so as to form a rectangular housing for the heating elements 1 of the positive temperature coefficient PTC type. These elements 1 have a generally elongated and generally rectangular shape and constant section. Each of the housings is closed by a plate screwed to the element. Each of the heating elements is in intimate contact, on at least its two main faces, with the material of the solid element 2. Electrical connectors of the heating elements 1 are protruding from the lower face of the heating body.

The heating elements used are of the PTC (positive temperature coefficient) type. A minimal increase in temperature causes a significant increase in resistance, thus limiting the current and therefore the electrical power produced. It creates a balance between the heat flux generated by the PTC and heat dissipation to the environment. If heat dissipation is rendered more efficient, this causes a cooling of the ceramic PTC component, and in turn leads to cooling down of the resistance component. Thus, the electric power increases to a new equilibrium state. The absorbed power is depending on the ambient temperature, the fluid temperature and flow rate of the pump circulating the fluid. Example: a heating element PTC with a rated power of 1500 Watts at an ambient temperature of 20° C., for heating the fluid from 0° C., the power required will be: 1700 Watts. For the same component and under the same conditions the power consumption will be of 1300 Watts to heat the fluid at 60° C. On a very small area one can afford to significantly increase the load per $cm^2$ without risking overheating, since this element is self-regulating, and is not in direct contact with the fluid to be heated.

The heating element PTC can run dry without risk of breakdown, without thermostat and electrical security means, it will automatically stabilize its temperature. Furthermore it is operable when supplied with different voltages and frequencies (110-240 volt 50/60 Hz).

A standard shielded heating element, as described above, without regulation thermostat will heat up to its rupture (breakdown). Besides all these benefits that are provided by the PTC elements, these latter can withstand cold and hot electrical insulation testing. A shielded heating element is normally tested in cold conditions. In hot conditions these tests can lead to destructive risks, and these tests are not very recommended by the manufacturers.

For example, a standard spiral heater to be in contact with the fluid and with a power of 1500 Watts has a space volume of about 165 $cm^3$. The solution with the PTC elements has about 36 $cm^3$ of volume, i.e. nearly 80% decrease in volume for the same power.

The heating body has been specially designed in order to use this technology and allow optimal heat exchange between the heating elements and the fluid to be heated.

The configuration of the same body can receive different heating elements of different powers depending on the application. The profile of the heating body may be elongated for receiving elements of higher power. This body may be made either in aluminum, brass, stainless steel or plastic, . . . , depending on the applications. An outer insulating shell protection further increases efficiency by reducing heat loss. Insulation between the heating body and this outer shell further reduces heat loss.

The PTC elements in their designs have a maximum temperature threshold that is set at the factory during manufacture. The heating elements are self-regulating, very economic with regard to energy. The power dissipation varies with the demand for a pre-established temperature threshold. They do not normally require a regulation or security thermostat.

Depending on the application, a mechanical or electronic thermostat allows the user to select the desired temperature threshold. The regulating device can be supplied with different voltages depending on the application.

With respect to internal combustion engines and, especially for vehicles, generators, . . . one or more PTC heating elements placed in the heating body and fed by the battery with 12 or 24 VDC, depending on the application, enable to continue heating when the device is no longer supplied with 110-230 volts. The goal is to allow the engine that is preheated by the device powered with 110-230 V to be further heated so that the engine arrives more quickly to the ideal operating temperature. This has a considerable impact on reducing fuel and pollution. Also, this solution promotes user comfort by getting a heating of the vehicle interior more quickly.

Depending on the various applications and fluid or gas to be heated, the circulation pump is adapted.

The invention claimed is:

1. A heating device for a fluid, comprising:
    a heating body with a fluid passage in a shape of a U; and
    at least one electric resistor disposed close to the heating body;
    wherein the heating body comprises:
        a solid element in which sections of the passage for the fluid correspond to legs of the U, the solid element comprising at least one open groove extending along and in front of a side of a hollow of the U-shape of the passage for the fluid, the at least one open groove being configured to receive the at least one electrical resistor, the at least one groove having a rectangular cross-section with a long side substantially parallel to a plane of the U and a small side transverse to the plane of the U.

2. The heating device according to claim 1, wherein the at least one open groove extends along and in front of each side of the hollow of the U-shape of the passage for the fluid.

3. The heating device according to claim 1, wherein the at least one electrical resistor is generally elongated and flat, and is substantially embedded in the at least one groove of the solid element of the heating body.

4. The heating device according to claim 3, wherein a width of the at least one groove and a width of the at least one resistor housed therein relative to a width of the hollow is chosen from the following:
    50% and 150%;
    80% and 120%; and
    90% and 110%.

5. The heating device according to claim 1, wherein the heating body comprises:
    at least one closure plate of the at least one groove, the closure plate being configured to be screwed to the solid element.

6. The heating device according to claim 1, wherein the U-shaped passage is formed by drilling the solid element of the heating body, the solid element being provided with at least one plug closing at least one of the drill holes.

7. The heating device according to claim 6, wherein the at least one plug is a thimble disposed in the fluid passage.

8. The heating device according to claim 1, wherein a fluid inlet in the heating body is at a free end of one of the legs of the U and a fluid outlet of the heating body is at a free end of the other leg of the U.

9. The heating device according to claim 1, wherein the solid element of the heating body is generally elongate along a principal direction and is of parallelepiped shape.

10. The heating device according to claim 9, wherein a ratio between a length and a width and/or thickness of the solid element of the heating body is chosen from the following:
    greater than 2;
    greater than 3; and
    greater to 4.

11. The heating device according to claim 1, wherein the at least one electrical resistor is of a positive temperature coefficient type.

12. The heating device according to claim 1, further comprising:
    a circulation pump hydraulically connected to the heating body at a fluid outlet in the heating body.

13. The heating device according to claim 1, wherein the heating body is covered by a cap with a thermal insulation.

14. The heating device according to claim 1, wherein the at least one electric resistor is not in direct contact with the fluid.

15. The heating device according to claim 1, wherein the solid element of the heating body is in a heat conductive material selected from the following materials: aluminum;
    brass;
    stainless steel; and
    plastic material.

16. The heating device according to claim 1, wherein the solid element of the heating body is of one piece made of a same material.

17. A combustion engine, comprising:
    a device for heating a coolant comprising:
        a heating body with a fluid passage in a shape of a U; and
        at least one electric resistor disposed close to the heating body;
        wherein the heating body comprises:
            a solid element in which sections of the passage for the fluid correspond to legs of the U, the solid element comprising at least one open groove extending along and in front of a side of a hollow of the U-shape of the passage for the fluid, the at least one open groove being configured to receive the at least one electrical resistor, the at least one groove having a rectangular cross-section with a long side substantially parallel to a plane of the U and a small side transverse to the plane of the U.

18. A method of preheating cooling fluid in a combustion engine, comprising:
    providing a heating device comprising:
        a heating body with a fluid passage in a shape of a U; and
        at least one electric resistor disposed close to the heating body;
        wherein the heating body comprises:
            a solid element in which sections of the passage for the fluid correspond to legs of the U, the solid element comprising at least one open groove extending along and in front of a side of a hollow of the U-shape of the passage for the fluid, the at least one open groove being configured to receive the at least one electrical resistor, the at least one groove having a rectangular cross-section with a long side substantially parallel to a plane of the U and a small side transverse to the plane of the U;
    circulating the cooling fluid through the heating device, thereby heating the cooling fluid with the heating device.

* * * * *